United States Patent

[11] 3,618,979

[72] Inventor Gulette Ronald S.
    Warren, Mich.
[21] Appl. No. 36,260
[22] Filed May 11, 1970
[45] Patented Nov. 9, 1971
[73] Assignee General Motors Corporation
    Detroit, Mich.

[54] VEHICLE OCCUPANT RESTRAINT
    1 Claim, 2 Drawing Figs.
[52] U.S. Cl. .................................................. 280/150 AB
[51] Int. Cl. ........................................................ B60m 21/02
[50] Field of Search .......................................... 280/150
    AB, 150 B, 87 R

[56] References Cited
    UNITED STATES PATENTS
    3,498,402  3/1970  Barenyi ........................ 280/150
    3,506,281  4/1970  Berryman ..................... 280/150
    3,552,769  1/1971  Kemmerer et al. ............ 280/150

Primary Examiner—Kenneth H. Betts
Attorneys—W. E. Finken and Herbert Furman

ABSTRACT: A vehicle includes a seat for supporting an operator in seated position, a steering column supporting a steering wheel for steering the vehicle, and a source of pressure fluid releasable in response to the vehicle receiving an acceleration pulse of predetermined amplitude and time. An occupant restraint for the operator includes an inflatable cushion of generally frustoconical shape surrounding the column and wheel and having its apical end mounted on the column adjacent the instrument panel of the vehicle. When the cushion is inflated, the basal end thereof is located in a position for impact by the operator.

PATENTED NOV 9 1971

3,618,979

INVENTOR.
Ronald S. Gulette
BY
Herbert Furman
ATTORNEY

VEHICLE OCCUPANT RESTRAINT

This invention relates to an occupant restraint for for vehicles and more particularly to an inflatable cushion for restraining movement of a seated operator of a vehicle relative to the steering wheel thereof when the vehicle and operator are subjected to acceleration pulses of predetermined amplitude and time.

The inflatable cushion of this invention is intended for use with a conventional inflatable restraint system. Such systems generally include a source of pressure fluid, a sensor controlling the release of the pressure fluid when the vehicle receives an acceleration pulse of predetermined amplitude and time, and a manifold for receiving the released pressure fluid and distributing it through a slotted diffuser tube to an inflatable cushion to thereby inflate the cushion and locate the cushion for engagement by an occupant of the vehicle.

In the preferred embodiment of this invention, the diffuser tube is in the shape of a radially slotted annular ring or torus secured to the steering column adjacent the instrument panel. The inflatable cushion is of generally frustoconical shape and the apical end of the cushion is suitably secured to the diffuser ring to mount the cushion on the vehicle. When the cushion is inflated, the inner wall of the cushion engages the steering wheel and is joined to the outer wall by a basal end wall which is presented for impact by the operator of the vehicle. The cushion may be stored in deflated condition in either an accordion-pleated manner or in a rolled-up manner.

The primary object of this invention is to provide an occupant restraint for the operator of a vehicle which includes an inflatable cushion deployed in a direction generally along the axis of the steering column and steering wheel of the vehicle and being of generally frustoconicla shape, with the apical end of the cushion being mounted on the column and the basal end of the cushion being presented for impact by the operator.

This and other objects of the invention will be readily apparent from the following specification and drawing wherein.

Figures 1, 2:
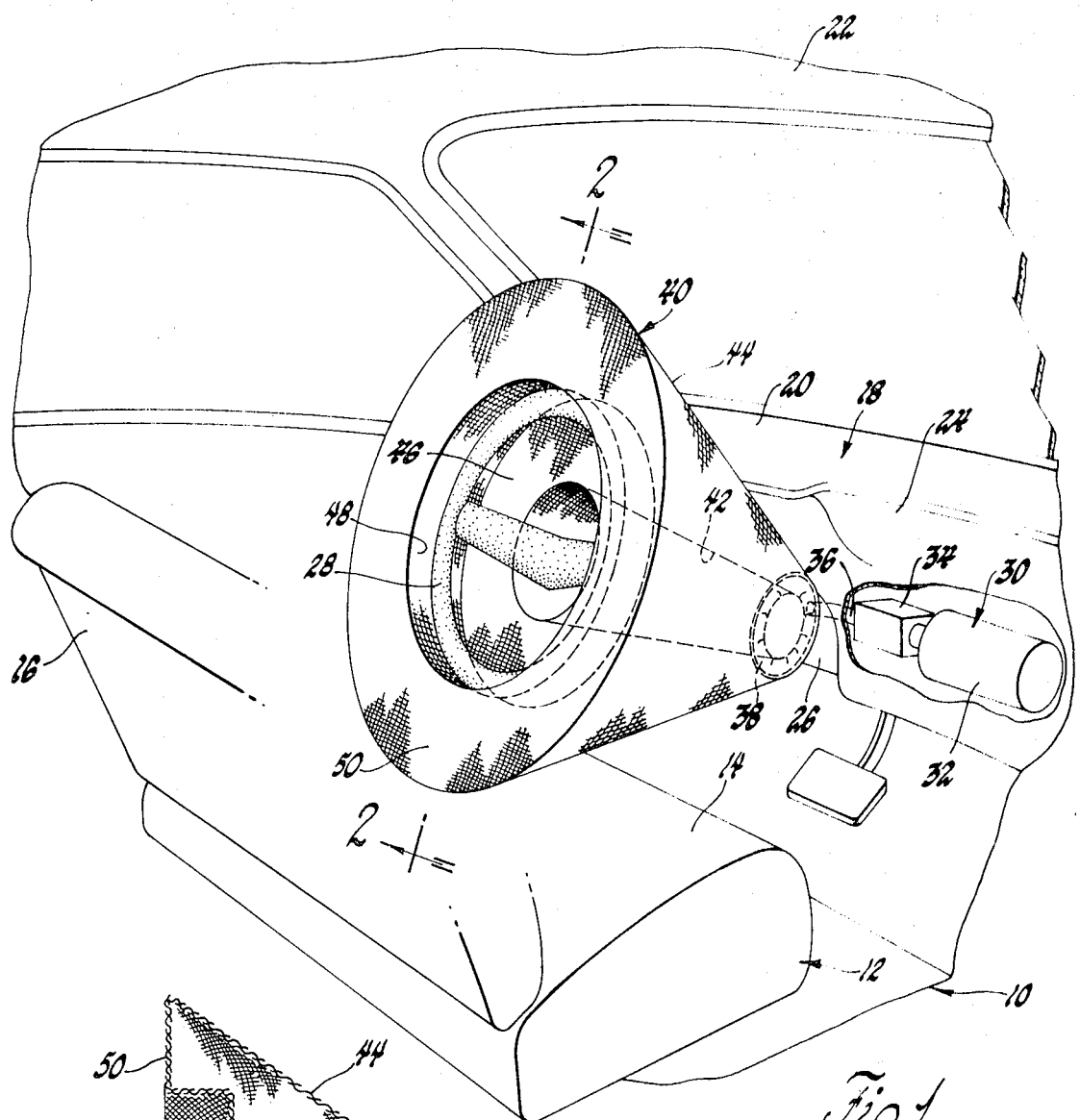
FIG. 1 is a perspective view of the interior of a vehicle embodying an occupant restraint according to this invention.
FIG. 2 is a sectional view of the inflatable cushion.

Referring to the drawing, a vehicle designated generally 10 includes a front seat 12 having a seat cushion 14 and a seat back 16 for supporting the operator in a seated attitude within the vehicle. The instrument panel 18 of the vehicle includes an upper surface 20 which faces generally toward the windshield 22 and a frontal surface 24 which faces generally toward the seated operator. A steering column 26 extends rearwardly and upwardly of the vehicle and outwardly of the frontal surface 24 of the instrument panel and mounts a steering wheel 28 to provide for steering of the vehicle by the operator. The steering column and wheel are conventional and form no part of this invention.

Mounted on the vehicle behind or below the frontal surface 24 of the instrument panel is a conventional inflatable restraint system 30. This system includes a pressure vessel 32 containing a supply of pressure fluid and sealed by a rupturable diaphragm, a sensor 34 for rupturing the diaphragm of the vessel when the vehicle receives an acceleration pulse of predetermined amplitude and time, and a manifold 36 for receiving the released pressure fluid. The manifold 36 is connected to an annular diffuser ring 38 which is suitably secured to the steering column 36 adjacent the frontal surface 24 of the instrument panel and includes a plurality of radial slots opening axially of the column. An inflatable cushion 40 according to this invention is of generally frustoconical shape and includes spaced inner and outer walls 42 and 44 respectively which are connected together at their apical end and conventionally secured to the diffuser ring 38 to mount the cusion on the vehicle The inner wall 42 and outer wall 44 flare outwardly with respect to each other but at different conical angles to the axis of the column 26. The inner wall 42 includes a radially extending portion 46 which merges into an axially extending portion 48. The portion 48 of the wall 42 and the outer wall 44 are connected by a basal end wall 50 which is located rearwardly of the steering wheel 28 or between the steering wheel and the operator of the vehicle for impact by the operator.

Although the inner wall 42 is shown as being a particular shape, it can be of other shapes and could flare outwardly at the same conical angle with respect to the axis of the wall as wall 44.

The stored position of the cushion is not shown, but in such position, the walls 42 and 44 could each be accordion pleated or rolled upon itself so as to be stored about the diffuser ring in any suitable type of releasable storage collar or housing surrounding the diffuser ring.

The cushion 40 can be made of any woven or knitted fabric which may or may not have pressure relief means embodied therein. Suitable fabrics include woven nylon which may be uncoated or coated with neoprene or urethane.

Thus, this invention provides an improved occupant restraint for the operator of a vehicle.

I claim:

1. In combination with a vehicle including a seat for supporting an operator in seated position, a steering column supporting a steering wheel for use by the operator, and a source of pressure fluid releasable in response to the vehicle receiving an acceleration pulse of predetermined amplitude and time, an operator restraint comprising, an inflatable cushion of generally frustoconical shape surrounding the column and wheel, means mounting the cushion adjacent the apical end thereof on the column, and means communicating the cushion with the the source of pressure fluid, the cushion in inflated condition having the inner and outer spaced walls thereof joined at the basal end thereof for impact by the operator.

* * * * *